Figure 1:
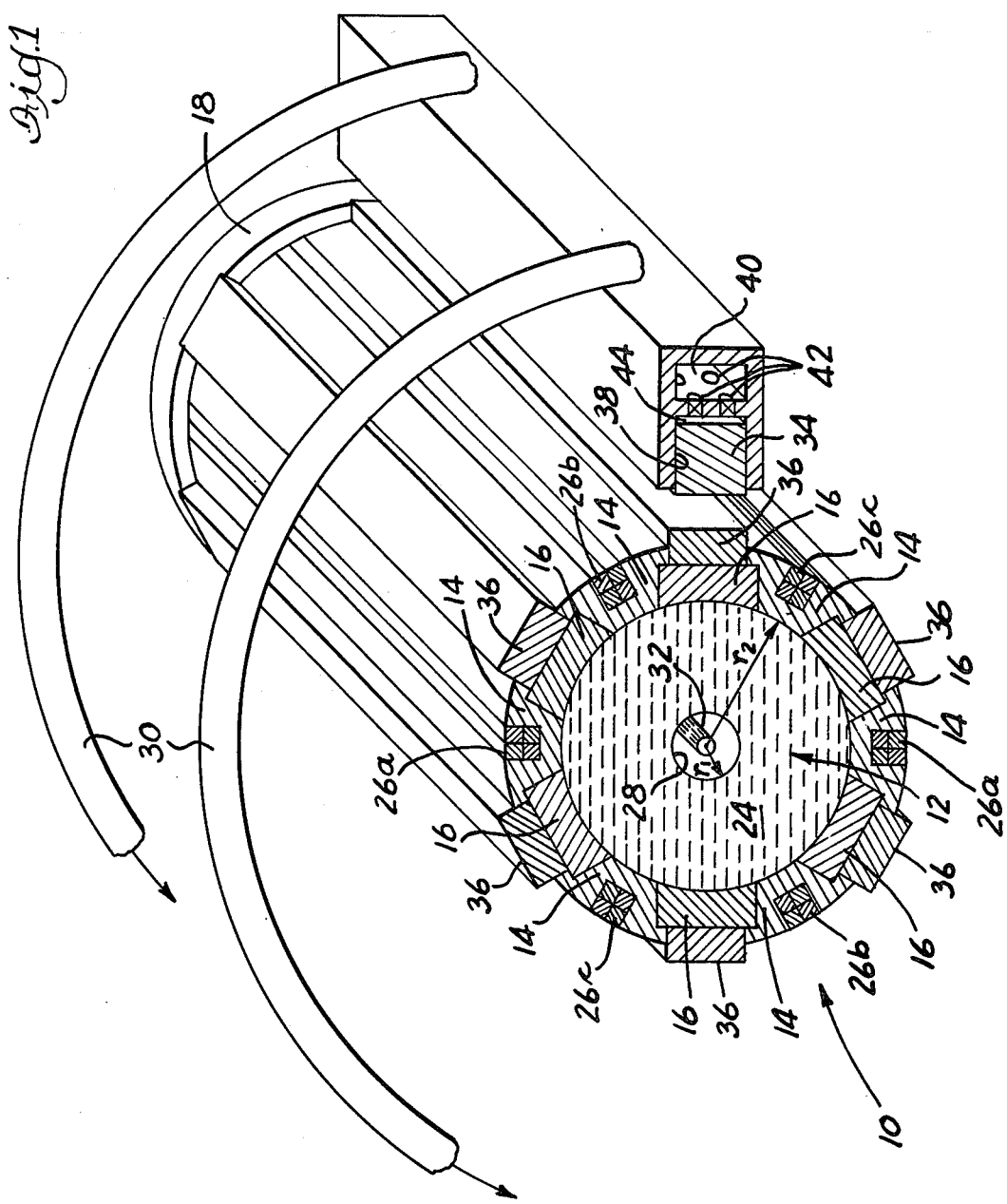

United States Patent [19]

Ohkawa

[11] 4,269,658
[45] May 26, 1981

[54] MECHANICAL COMPRESSION PLASMA DEVICE

[75] Inventor: Tihiro Ohkawa, LaJolla, Calif.

[73] Assignee: General Atomic Company, San Diego, Calif.

[21] Appl. No.: 768,263

[22] Filed: Feb. 14, 1977

Related U.S. Application Data

[63] Continuation-in-part of Ser. No. 622,089, Oct. 14, 1975, abandoned, and a continuation-in-part of Ser. No. 375,341, Jul. 2, 1973, abandoned.

[51] Int. Cl.² .................................................. G21B 1/00
[52] U.S. Cl. ............................... 176/3; 315/111.7; 313/231.3
[58] Field of Search ......................... 176/1, 3, 6, 8, 7; 315/111.2–111.7; 313/231.3–231.6

[56] References Cited

U.S. PATENT DOCUMENTS

| | | | |
|---|---|---|---|
| 3,677,326 | 7/1972 | Grasse | 176/49 |
| 3,708,391 | 1/1973 | Christofilos | 176/7 |
| 3,712,996 | 1/1973 | Kugler | 313/231 |

OTHER PUBLICATIONS

Proceedings of the High Beta Workshop, Jul. 28–Aug. 1, 1975, pp. 60–77, by Robson et al.
Proceedings of the High Beta Workshop, Jul. 28–Aug. 1, 1975, pp. 78–90, by Shearer.
The Physics of Fluids, vol. 17, No. 3, 3/74, pp. 662–663, by Book et al.
The Physics of Fluids, vol. 17, No. 9, 9/74, pp. 1707–1718, by Barcilon et al.
Sixth Symposium on Engineering Problems of Fusion Research, Nov. 18–21, 1975, pp. 983–987, by Turchi et al.

*Primary Examiner*—Harvey E. Behrend
*Attorney, Agent, or Firm*—Fitch, Even, Tabin, Flannery & Welsh

[57] ABSTRACT

Apparatus for producing a pinched plasma at high kinetic energy levels which includes an elongated containment means having a generally cylindrically shaped bore defining a reservoir, an electrically conductive liquid within the bore and means for rotating the liquid to create centrifugal force sufficient to create a cylindrical space generally along the axis of the bore, means for creating a plasma within the cylindrical space, means for applying a magnetic field the length of the bore and means for mechanically reducing the diameter of the bore and cylindrical space to compress the magnetic field to provide a pinch effect on the plasma.

17 Claims, 3 Drawing Figures

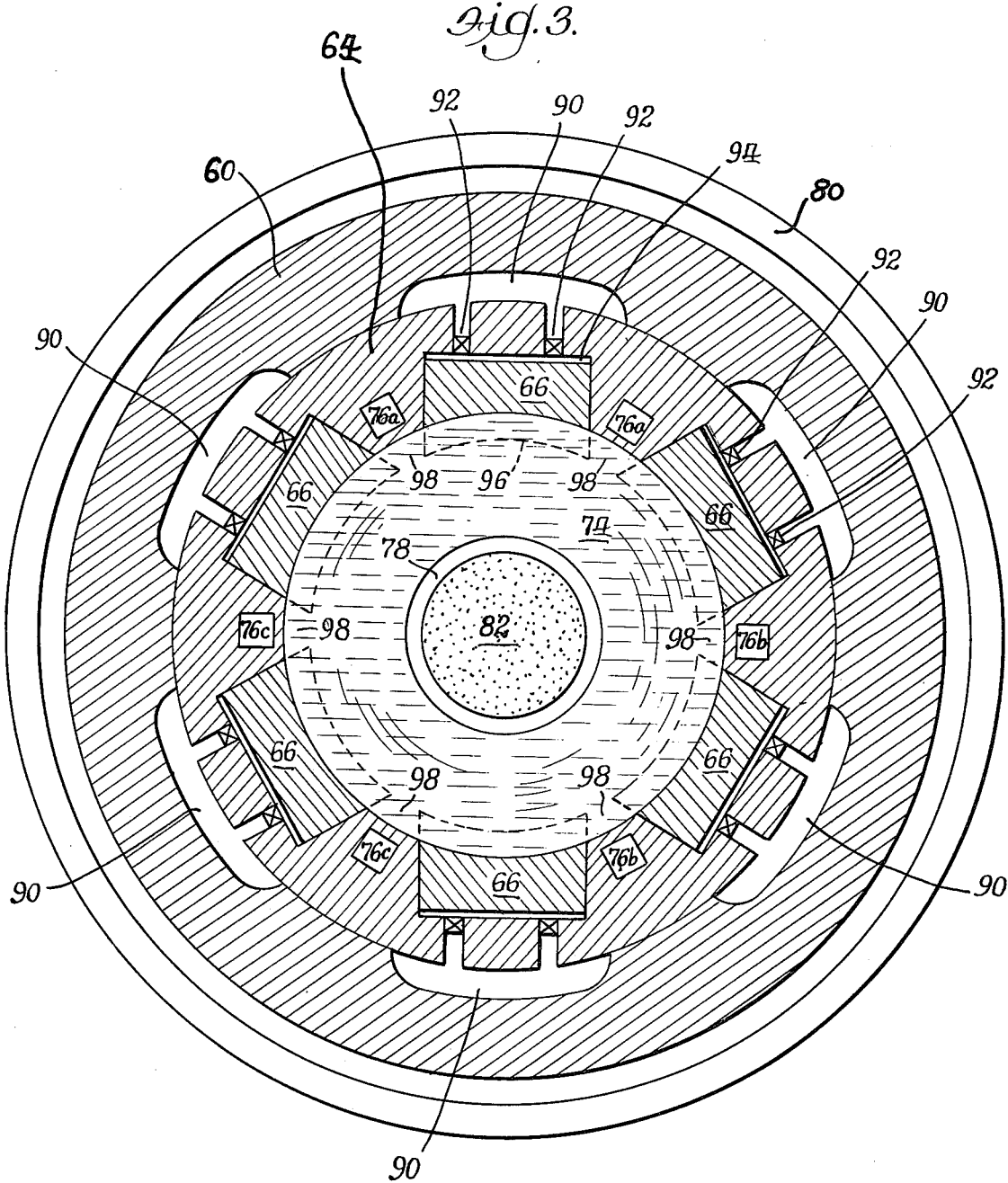

MECHANICAL COMPRESSION PLASMA DEVICE

This application is a continuation-in-part of application Ser. No. 622,089 filed Oct. 14, 1975 now abandoned and Application Ser. No. 375,341 filed July 2, 1973, now abandoned which are herein incorporated by reference.

The present invention generally relates to nuclear physics and, more specifically, to apparatus for generating and confining a high kinetic energy plasma at elevated temperatures.

Broadly stated, there are two extremes wherein thermonuclear fusion may be sustained; namely, low density magnetic confinement as well as high density inertial confinement approaches. The present invention, however, is concerned with an approach that is intermediate the two extremes and is directed to apparatus for generating and confining a plasma at desired high temperature or energy levels preferably approaching or exceeding thermonuclear levels (e.g., 5 keV to 10 keV). The particles of the plasma are compressed toward the central axis and accelerated to high kinetic energies by an increasing magnetic field produced by electric currents induced on the inward facing surface of a rotating conductive liquid liner driven rapidly inward by a mechanical drive system. The apparatus is operable with particle densities of up to about $10^{19}$ per cubic centimeters ($10^{19}$ cm$^{-3}$) and magnetic fields of about $2 \times 10^6$ gauss (G).

The phenomenon wherein magnetic fields are used to drive the plasma inwardly to a constricted volume and thereby greatly increase the temperature and the density of the plasma is referred to as the "pinch effect" and is described in much of the literature directed to controlled thermonuclear reactions and nuclear fusion. For example, if magnetic coils are used for compressing the plasma directly, requiring a magnetic field within the range of 150 to 200 kG, and open ended devices heretofore known such as linear theta pinch devices, would require a cylinder that would be about one mile long. If an electrically driven conductive solid liner is used to amplify the magnetic field, devices heretofore known would require an electric power storage and delivery system to discharge a large amount of energy, for example, of the order of $10^9$ joules in a few milliseconds. Furthermore, the liner has to be replaced after every pulse.

Accordingly, it is an object of the present invention to provide an improved apparatus that is capable of providing the pinch effect on plasma to approach thermonuclear temperatures which is smaller in physical size and requires lesser initial energy and does not require the storage of large electrical energies.

Another object of the present invention is to provide apparatus of the aforementioned type which generates the desired pinch effect to increase the temperature and the density of a plasma by magnetic pressure amplified by application of a mechanical drive.

Figure 2:
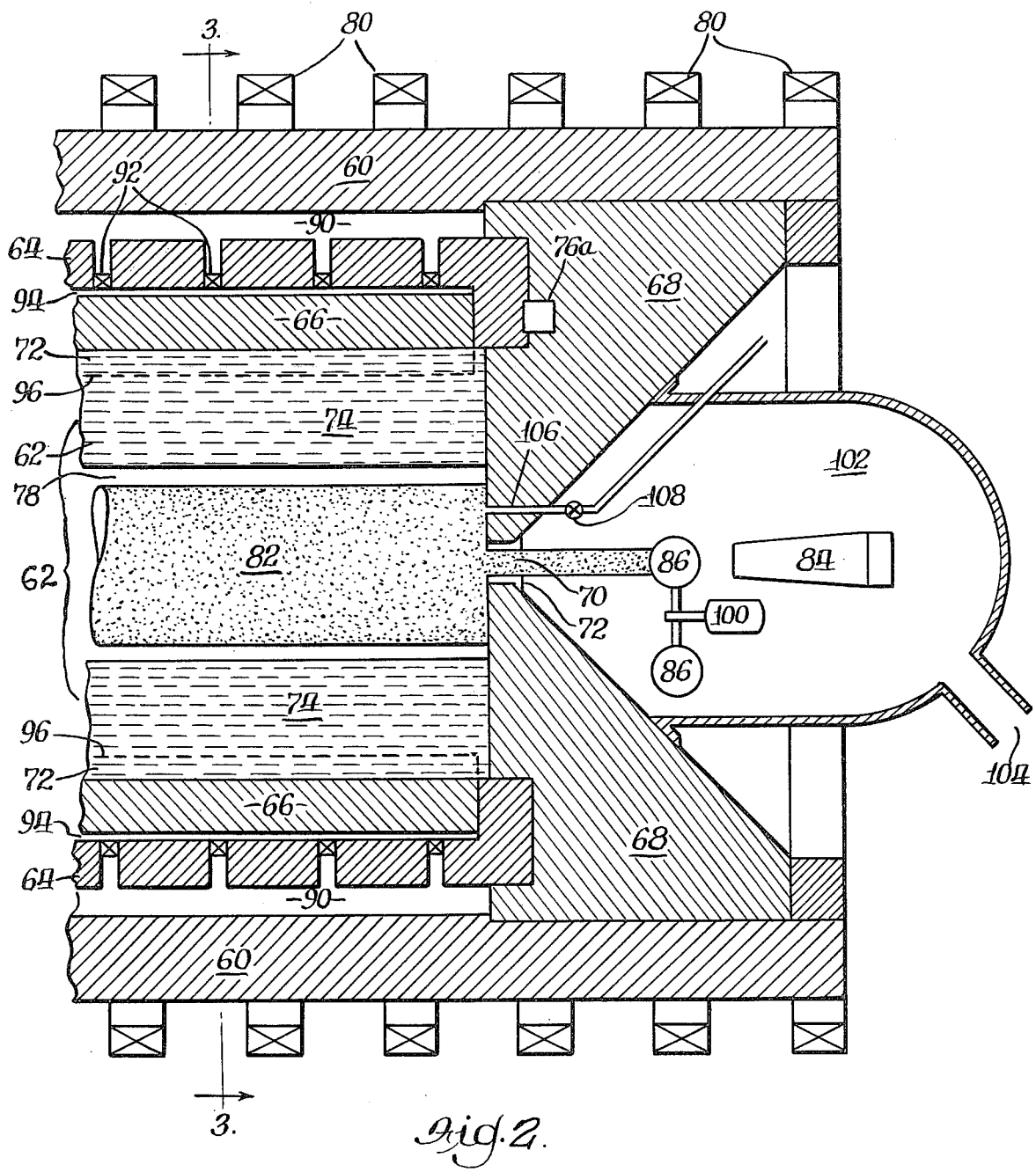

Other objects and advantages will become apparent upon reading the following detailed description while referring to the attached drawings of which FIG. 1 is a perspective view, partially in section, of apparatus embodying the present invention, FIG. 2 is a partial, cross sectional side view of the present invention, and FIG. 3 is a cross sectional view of the apparatus of FIG. 2 taken through line 3—3.

Broadly stated, the present invention will be first described in conjunction with the straight device or apparatus shown in FIG. 1, which includes a containment means, indicated generally at 10, having an elongated cylindrical bore, indicated generally at 12, formed by a number of stationary wall members 14 and movable wall members 16. The movable members 16 are located between the stationary members and the movable and stationary members alternate around the circumference of the bore 12. The inner surfaces of the members 14 and 16 are curved to define the circularly cross sectional bore 12. The length of the members and of the bore may be about 10 meters or more. As will be described hereinafter, the movable wall members 16 can be driven toward one another to reduce or constrict the effective diameter of the bore 12. Suitable end plates such as end plate 18 schematically illustrated in the drawing are provided to seal the end surfaces and thereby effectively define a reservoir within the bore 12.

It should also be realized that while six movable wall members 14 are specifically shown in FIG. 1 to reduce the diameter of the bore, the apparatus could also be designed to utilize a greater or fewer number of movable wall members. The use of six members as shown is particularly suited to the geometric symmetry of a three phase electrical system as will be described hereinafter.

In keeping with certain aspects of the invention embodied in the apparatus of FIG. 1, a liquid conductor or liquid liner 24 is placed in the bore 12 so that it is almost filled, the liquid conductor preferably being a molten metal such as mercury, lithium, copper or sodium. However, lithium is preferred for the liquid liner applications involving substantial neutron flux densities since it is capable of breeding tritium and is also capable of serving as a blanket. While sodium, mercury and copper also function as blankets, they are not capable of breeding tritium. Three sets of induction coils, shown as 26a, 26b and 26c in the figure, are positioned parallel to the axis of the bore which, when they are energized, causes the liquid conductor to inductively rotate about the axis of the bore at a sufficient angular velocity so that centrifugal force will create a cylindrical space or vacuum 28 of predetermined diameter along the axis. The vapor pressure of molten lithium is acceptable (1 mm mercury at 700° C.) and the centrifugal force due to rotation tends to keep the vapor near the interface of the cylindrical space 28. A magnetic coil 30 is positioned to surround the containment means and apply a relatively weak magnetic field of about several thousand gauss, i.e., preferably about 5000 gauss, the length of the cylinder parallel to the axis. Plasma 32 is created in the cylindrical vacuum space 28 by some independent means (not shown) such as a laser beam, high energy electron beam or gas discharge.

With respect to the coils 26a, 26b and 26c, they are adapted to provide a steady rotation of the liquid liner 24 at an angular velocity of at least about 600 rpm. The usual turbulent viscous losses are somewhat increased by the presence of the rotating field generated by the coils 26. Such viscous losses are the principal losses and are roughly analogous to turbulent hydromagnetic channel flows which means that the field strength that is provided by the coils 26a, 26b and 26c should be approximately 10,000 gauss. Three pairs of coils are shown in the drawing, since the illustrated embodiment utilizes a three phase system and has a pair of coils for each phase. It should be understood, however, that only two coils can be used to rotate the liner 24, i.e. one above and one below the bore in the position of the coils 26a. The coils 26 may be made from several relatively thin insulated copper bars as shown in the drawing in a manner similar to the construction of stater windings of large alternating current motors and alternators. The bars are adapted to carry electric current parallel to the axis of the bore 12. Each of the coils 26a, 26b and 26c extend beyond the ends of the bore where they bend around to be continuous with the diametric opposite coil carrying the same designator. Thus, the coils 26 extend the full length of the system which is about ten meters and continue slightly beyond the ends where they bend back to maintain electrical continuity with the portion of the coil on the opposite side of the bore.

The coils 26 together generate a rotating magnetic field configuration which must penetrate to the liner 24 to act upon it. Thus, the stationary and movable wall members 14 and 16 are preferably fabricated from either nonconducting, semi-conducting or suitably laminated conducting materials so that the field produced by the coils 26 can effectively rotate the liner material 24. The drive means for moving the movable wall members 16 toward one another may be metallic without seriously affecting the field produced by the coils 26, since the apparatus can be placed sufficiently distant from the bore 12. The drive means will be described in more detail hereinafter.

The coils 30 carry electric current around the apparatus in the azimuthal direction as shown and produce a steady magnetic field within the bore 12. In this regard, the walls 14 and 16 as well as the apparatus which drives the movable wall 16 toward one another are fabricated from non-ferromagnetic materials so that the field produced by the coils 30 is not affected by the presence of ferromagnetic materials. In the event ferromagnetic materials are employed, their size and placement must be such that the magnetic field configuration produced by the coils 30 within the bore 12 are not adversely affected.

The exact spacing of the coils 30 from one another is not critical for proper operation of the apparatus, the final choice of spacing being the result of factors such as field homogeneity in the rotating liner 24, access to the portions of the apparatus between adjacent coils 30, the field strength limitations of superconducting materials, and structural considerations, such as mounting the stationary wall members 14 as well as the means for driving the movable wall members 16.

To pinch the magnetic field and plasma to cause the plasma to approach thermonuclear temperatures, the rotating conductor or liner 24 is compressed by physically moving the wall members 16 toward each other at a sufficient speed to be effective. Thus, an impulse or force is applied to the movable wall members by mechanically driven hammers 34 which are positioned adjacent to and adapted to strike a striking surface 36 that is integrally formed with or attached to each of the wall members 16. The hammers 34 are preferably driven by suitable hydraulic drive means so that the necessary force is applied to the movable side walls 16 via the striking surfaces 36. The hammers 34 are accelerated toward the striking surfaces 36 using apparatus which is similar to pneumatic or pneumatic-hydraulic high energy rate drivers of the type that are presently used in shock testing large components or in high energy forges and the like. The present state of the art of such devices provides the capability of delivering the necessary energy per unit area at the required rate for use with the apparatus of the present invention. As shown in the drawing, the hammer 34 is movably positioned within a recess 38 in a manner analogous to a piston within a cylinder. Thus, the hammer 34 shown in the drawing will move to the left and strike the striking surface 36 when the apparatus is activated. A reservoir 40 filled with high pressure gas is used to drive the hammer 34 when a series of high speed valves, schematically illustrated at 42, are opened to communicate the high pressure gas into the space 44 behind the hammer 34. The high pressure gas accelerates the hammers 34 up to the proper velocity of about 500 feet per second and cause them to strike the surfaces 36 which moves the movable wall members 16 inwardly toward the center as is desired. It should be understood that while only one drive apparatus associated with a single movable wall member has been shown in the drawing, a drive arrangement, together with the reservoir, valves and hammer is provided for each of the movable wall members 16 of the apparatus. It should also be realized that the drive apparatus is located inside of the coils 30 and is suitably secured structurally so that only the hammers 34 will move to strike the surfaces 36 and move the movable wall member 16. In this regard, it should also be realized that the stationary walls are also suitably secured so that they will remain stationary and only movable wall member 16 will move in the described manner. When the drive means is activated, the rotating liner 24 of conductive liquid is compressed to reduce the diameter of the cylindrical space 28 therein which impinges the magnetic field and thereby pinches the plasma 32 so that it will attain high temperatures which may even approach thermonuclear temperatures on the order of about 10 keV at a density of about $10^{19}$ cm$^{-3}$ (or $10^{25}$ m$^{-3}$ in MKS units).

More specifically, with respect to the underlying theory concerning the functionality of the present invention, it is noted that the Lawson criterion of $n\tau \geq 10^{14}$ cm$^{-3}$ seconds must be satisfied for either the straight device shown in the drawing.

With the straight configuration, the end loss time is assumed to be the dominant loss. The confinement time $\tau$ is then given by $$\tau \approx L/v_s,$$

where L is the length of the device and $v_s$ is the sound wave velocity. If the plasma would reach a temperature of 10 keV, $v_s = 10^8$ cm/sec and the following relation exists:

$$L \geq \frac{10^{22}}{n(\text{cm}^{-3})} \text{ cm}$$

If the plasma 32 is heated by compression, the relations are as follows:

$$n = \alpha n_o$$
$$T = \alpha^{(\gamma-1)} T_o$$
$$v_s = \alpha^{(\gamma-1)/2} v_{so},$$

where subscripts o denote the initial state, $\alpha$ is the compression ratio, T is the temperature and $\gamma$ is the ratio of specific heat. The compression time $\tau_c$ must be shorter than the initial end loss time $L/v_{so}$. Therefore the ratio $\tau/\tau_c$ is limited to $$\tau/\tau_c \approx \frac{v_{so}}{v_s} \approx \alpha^{-(\gamma-1)/2}.$$

For collisional compression, $\gamma = 5/3$, the ratio becomes $$\tau/\tau_c \approx \alpha^{-\frac{1}{3}}.$$

Even for $\alpha = 10^3$, the compression time must be shorter than $10\tau$. For example, $L = 10$ m and $\tau = 10$ μsec, the compression with $\alpha = 10^3$ must be done in a period shorter than 100 μsec. For a slow compression of $\tau_c = 1$ msec, the length L of the apparatus shown in the drawing must be 100 m.

The collision mean-free path $\lambda$ scales as $$\lambda = \alpha^{\frac{1}{2}} \lambda_o.$$

If the plasma is collisional in the final state, it is collisional during the compression. For particle densities of $n = 10^{19}$ cm$^{-3}$ and a temperature $T = 10$ keV, the collisional mean-free path is 50 cm. Therefore the plasma 32 in a 10 m device is collisional at all times.

The adiabatic compression scales $\beta$ as $$\beta = \beta_o \alpha^{\gamma-2} = \beta_o \alpha^{-\frac{1}{3}}.$$

For collisional compression, however, adiabatic compression $\beta$ is reduced. This formula does not hold if the plasma has a sharp boundary, which will be the case when the compression time is much shorter than the skin time $\tau_S$, which scales $$\tau_s \uparrow \mu_o \sigma r^2 = \alpha^{3/2} \gamma^{-5/2} = \alpha^o,$$

where r is the plasma radius and $\sigma$ is the conductivity of plasma. For $\sigma = 10^9$ (ohm m)$^{-1}$ and r = 1 cm, the skin time $\tau_s = 10^{-1}$ sec which is much longer than the compression time. Therefore, $\beta$ is likely to be near unity.

The minimum plasma radius is determined by heat conduction and skin effect considerations. The classical energy confinement time $\tau_E$ is given by $$\tau_E = \frac{r^2}{D} \sqrt{\frac{m_e}{m_i}}$$

where D is the classical diffusion constant and is given by $D = np/B^2$. By using $D = \mu_o^{-1} \sigma^{-1} \beta$, we have $$\tau_E = \mu_o \sigma r^2 \beta^{-1} \sqrt{m_e/m_i}.$$

For $\beta = 1$ and $\sigma = 10^9$ ohm$^{-1}$m$^{-1}$, we have $$\tau_E = 15 \, r^2 (m)$$

and a radius of 1 mm is enough to give $\tau_E \sim 10^{-5}$ sec. It does not make sense to choose the plasma radius much smaller than the skin depth of the conducting fluid because the stored magnetic energy in the fluid becomes too large a fraction of the total energy.

$$r = \sqrt{\tau/\mu_o \sigma_f}$$

where $\sigma_f$ is the electric conductivity of the fluid. For $\sigma_f = 10^6$ ohm$^{-1}$m$^{-1}$ and $\tau = 10^{-4}$ sec, r ~ 1 cm.

As long as the plasma column is straight, $\theta$-pinch plasmas are known to be stable. However, the column may bend slightly due to the imperfections in the system and then become susceptible to an instability. The column is unstable against a ballooning mode if $\beta < rR\pi^2/L^2$, where R is the radius of the curvature of the bend. By introducing $\Delta$, the displacement of the colum, the stability condition becomes $\Delta \leq \beta^{-1} r$. If the column stays straight within its radius, it is stable against the ballooning mode.

For apparatus that is 10 meters in length, the plasma will reach a temperature of 10 keV if the particle density n is $10^{19}$ cm$^{-3}$, the magnetic field strength generated by coil 30 is 2000 gauss, the confinement time $\tau$ is $10^{-5}$ seconds and the compression time $\tau_c$ is $10^{-4}$ seconds.

To provide an understanding of the dynamics of compressing or imploding the liner material 24 by moving the movable wall members 16 toward one another, the following description sets forth the factors that are involved in terms of a model of a cylinder of incompressible material in a vacuum which is the simplest model to describe. Referring to the drawing, the rotating liquid liner 24 is analogized to a cylinder having inner radius $r_1$, outer radius $r_2$ and density $\rho$. At $t = 0$, assume pressure p is applied around the cylinder. The following equations describe the motion:

$$\frac{d}{dt}\left[\left(\frac{dr_2^2}{dt}\right)^2 \ln\left(\frac{r_2}{r_1}\right)\right] = -\frac{4}{\rho}\frac{dr_2^2}{dt} p$$

$$\frac{d(r_2^2)}{dt} = \frac{d(r_1^2)}{dt}.$$

To obtain an approximate solution, the time derivative of the logarithmic term is neglected, obtaining $$\frac{d^2}{dt^2}(r_2^2) = -\frac{2p}{\rho}\left(\ln\frac{r_2}{r_1}\right)^{-1},$$

and $$r_2^2 = r_2^2(t = 0) - \frac{2}{\rho\left(\ln\frac{r_2}{r_1}\right)} \iint_0^t p \, dt \, dt$$

$$r_1^2 = r_1^2(t = 0) - \frac{2}{\rho \ln\left(\frac{r_2}{r_1}\right)} \iint_0^t p \, dt \, dt$$

However if the pressure is constant during the compression, then:

$$r_1^2 = r_1^2(t = 0) - \frac{t^2 p}{\rho \ln r_2/r_1}.$$

If the pressure is applied as an impulse, then:

$$r_1^2 = r_1^2(t = 0) - \frac{2t}{\rho \ln r_2/r_1} \int p \, dt.$$

To minimize the pressure for a maximum compression, the pressure should last for most of the compression period. The compression time $\tau_c$ is given by $$\tau_c = \left\{ \frac{[r_1^2(t=0) - r_1^2]\rho \ln r_2/r_1}{p} \right\}^{\frac{1}{2}}.$$

For a pressure p=10$^4$ atm, density $\rho$=1 gm/cm$^3$, and r$_1$=10 cm, the compression time $\tau_c$ is approximately 200 $\mu$sec.

With this high pressure, the assumption of incompressibility does not apply unless the transit time of the second wave is much shorter than the compression time. The sound wave velocity is of the order of 10$^5$ cm/sec and the transit time is shorter but comparable. The inclusion of compressibility does not appreciably change the results and therefore the equations are applicable to the liquid liner 24.

Deceleration starts when the magnetic field inside the cylinder is compressed and its pressure becomes significant. From the laws of flux conservation:

$$\frac{d}{dt}\left[\left(\frac{dr_1}{dt}\right)^2 \ln\left(\frac{r_2}{r_1}\right)\right] = \frac{4}{\rho} \frac{B_m^2 r_m^4}{2\mu_o} \frac{1}{r_1^4} \frac{dr_1^2}{dt},$$

where the subscript m denotes the values where the compression cases. By integrating over time.

$$\frac{dr_1^2}{dt} = \left(\frac{2B_m^2 r_m^2}{\mu_o \rho \ln \frac{r_2}{r_1}}\right)^{\frac{1}{2}} \left[1 - \frac{r_m^2}{r_1^2}\right]^{\frac{1}{2}}$$

and $$\psi + \tfrac{1}{2} sh\, 2\psi = \left(\frac{2B_m^2}{\mu_o \rho\, r_m \ln \frac{r_2}{r_1}}\right)^{\frac{1}{2}} (t_m - t)$$

where $$r_1 = r_m ch\phi.$$

When the imploding cylindrical liner 24 is being decelerated, it becomes unstable as a result of the Raleigh-Taylor plasma instability. The growth rate G is given by $$G = \sqrt{kg}$$

where g is the deceleration and k is the wave number and is given by m/r. The deceleration is given by the equation $dr_1^2/dt$ above and is $$g = \frac{1}{2r_m}\left(\frac{B_m^2}{\mu_o \rho \ln \frac{r_2}{r_m}}\right) \frac{r_m}{r_1}\left[\frac{2r_m^4}{r_1^4} - \frac{r_m^2}{r_1^2}\right] \approx$$

$$\frac{B_m^2}{2r_m \mu_o \rho \ln \frac{r_2}{r_m}}$$

For magnetic field strength B$_m$ of 10$^6$ gauss, r$_m$=1 cm and $\rho$=1 gm/cm$^3$, we have $$G = \sqrt{m}\, 8 \times 10^4 \text{ sec}^{-1}.$$

The growth time is comparable to the desired confinement time and dynamic dwelling time except for large m modes.

To stabilize the liner 24, it may be rotated by the induction coil 26 much the same as the operation of an induction motor. If the liner is given angular velocity $\Omega_o$ initially, the compression will increase the angular velocity. The radial distribution of the angular velocity depends on viscosity. The time constant for the viscose damping $\tau_v$ is long for a common fluid such as mercury. It is given by $$\tau_v \approx \frac{\rho\, r^2}{\eta}$$

where $\eta$ is the viscosity and is 1.5 centipoise for mercury. For r=1 cm the time constant is 800 seconds and, therefore, the viscosity is negligible and the angular momentum of the fluid element is preserved. The angular velocity $\Omega$ is given by $$\Omega = \Omega_o r^2(t=0)/r^2.$$

The centrifugal force at the interface is given by $$\rho r_1^4(t=0)\Omega_o^2 r_1^{-3}.$$

With the centrifugal force, the growth rate becomes $$G = [kg - 3k\, r_1^4(t=0)\, r_1^{-3}\, \Omega_o^2]^{\frac{1}{2}}$$

The stability condition may be given by $$\Omega_o > \frac{r_1^2}{r_1^2(t=0)} \sqrt{g/(3r_1)}.$$

With deceleration g=10$^8$ m/sec$^2$, r$_1$(t=0)/r$_1$=30, and r$_1$=1 cm then $$\Omega_o > 64 \text{ sec}^{-1} \approx 610 \text{ r.p.m.}$$

This value is easy to obtain. If the angular velocity is too large, the compression will stop before the inside magnetic pressure builds up to the desired value. This sets an upper limit on $\Omega_o$. This condition is given by $$\frac{r_1^2}{r_1^2(t=0)} \sqrt{g/r_1} > \Omega_o > \frac{r_1^2}{r_1^2(t=0)} \sqrt{g/3r_1}.$$

For the above example, 1060 r.p.m. > $\Omega_o$ > 610 r.p.m.

Thus, the initial angular velocity before compression by the movable wall members 16 is begun must be between 610 rpm and 1060 rpm for the values described.

One way of compressing the liner 24 is to use magnetic pressure produced by a coil wound around the liner. The minimum energy W$_m$ required for the cylindrically shaped liner is given by $$W_m = 2 \frac{B_m^2}{2\mu_o} \pi r_m^2.$$

For a magnetic field strength $B_m$ of $2 \times 10^6$ gauss, $r_m = 1$ cm, and $L = 10$ m, the minimum energy required is:

$$W_m = 120 \text{ MJ}$$

The required magnetic field $B_c$ to be produced by such a coil is then given by $$B_c = (\mu_o W_m / L \pi r_c^2)^{\frac{1}{2}}.$$

where $r_c$ is the radius of the coil and 100% efficiency is assumed. For $W_m = 10^8$ J, $L = 10$ m, $r_c = 0.3$ m, the magnetic field $B_c$ produced by the coil will have to be about 60 kG. With a realistic value for efficiency, the field is probably in the range of 150~200 kG and the total energy involved is of the order of $10^9$ joules, which would require a high energy source as well as an electric switch capable of switching the high energy values.

In accordance with an important aspect of the present invention and noting that since the compression is done mechanically by a liner, a mechanical drive rather than a magnetic drive for compressing it has several advantages. A hydraulic drive is preferred among the various mechanical approaches, because it has an added advantage of eliminating a solid liner by using the conducting liquid liner 24 as the hydraulic fluid. The key question for this approach is whether the compression could be done fast enough.

To determine whether such hydraulic compression can be done at sufficient speed, consider the vacuum space 28 of cylindrical radius $r_1$ surrounded by the rotating fluid liner 24 having radius $r_2$. The axially symmetrical hammers or plungers 34 provide an impulse at radius $r_2$. For the case where the impulse is slowly applied, that is, the wavelength of the acoustic wave corresponding to the period of the impulse is larger than $r_2$, the calculations previously described for the model of the cylinder of incompressible material are applicable.

For an impulse of shorter periods, we have to take compressibility, thus acoustic wave, into account. The equations of motion are given by $$\rho \left( \frac{\partial v}{\partial t} + v \frac{\partial v}{\partial r} \right) = - \frac{\partial p}{\partial r}$$

$$\frac{\partial \rho}{\partial t} + \frac{1}{r} \frac{\partial (\rho v r)}{\partial r} = 0.$$

The density potential $\psi$ is introduced and is defined by $$\begin{cases} r\rho = \frac{\partial \psi}{\partial r} \\ r\rho v = -\frac{\partial \psi}{\partial t} \end{cases}$$

By going from Eulerian coordinates (r,t) to Lagrangian or material coordinates ($\psi$,t), $$v = \frac{\partial r}{\partial t}$$

-continued $$\frac{\partial^2 r}{\partial t^2} = -r \frac{\partial p}{\partial \psi}.$$

By using $dp/d\rho = v_s^2$ where $v_s$ is the sound velocity, then $$\frac{\partial^2 r}{\partial t^2} = + v_s^2 \left( \frac{\partial r}{\partial \psi} \right)^{-2} \left( \frac{1}{r} \right) \frac{\partial^2 (r^2/2)}{\partial \psi^2}$$

$$= + v_s^2 \rho^2 r \frac{\partial^2 (r^2/2)}{\partial \psi^2},$$

or $$\frac{\partial^2}{\partial t^2} \left( \frac{r^2}{2} \right) = \frac{1}{r^2} \left[ \frac{\partial}{\partial t} \left( \frac{r^2}{2} \right) \right]^2 =$$

$$v_s^2 \rho^2 r^2 \frac{\partial^2}{\partial \psi^2} \left( \frac{r^2}{2} \right).$$

For a small amplitude wave, $$\psi \approx \frac{r_o^2}{2} \rho_o$$

$$r^2 = r_o^2 + 2\xi r_o.$$

Where $\rho_o$ is the undisturbed density and $r_o$ is the initial position of fluid elements. Then $$\frac{\partial^2 \xi}{\partial t^2} \approx v_s^2 \frac{\partial^2 \xi}{\partial r_o^2}.$$

This is a standard acoustic wave equation. The solution is given by $$\xi = \xi(v_s t - k r_o),$$

where k is the wave number.

For a large amplitude wave, the equation must be solved numerically. The main effect of the finite amplitude is to steepen the wave front provided that the dissipation is negligible at higher harmonic frequencies. At the frequency range of interest, $10^4$ sec$^{-1}$, the dissipation is negligible.

The acoustic velocities for a typical fluid such as mercury, is $1.5 \times 10^5$ cm/sec. The wavelength corresponding to $10^4$ sec$^{-1}$ frequency is 90 cm, which is larger but comparable to a typical value for the radius.

In accordance with an important aspect of the present invention, the impulse may be produced by the combination of the hammer 34 and the movable wall members 16 which function much like a piston. For a cylindrical geometrical configuration, the members 16 are preferably shaped in such a way to produce an approximate axially symmetrical impulse and it is desired that members 16 have a curved inner surface as shown. The deceleration time of the hammer 34 must be matched with the frequency of the wave generated. For a hammer with a mass M per unit area of fluid and initial velocity u, we have $$\omega M u \approx p$$
$$\approx \rho_1 v_s^2 = \rho_o v_s u.$$

where p is the pressure generated and $\rho_1$ is the density increment. By equating the deceleration time and the acoustic frequency, $$M = \rho_o/k.$$

Since $kr_2 \gtrsim 1$, the mass of the hammer is comparable to the fluid mass. The velocity of the hammer 34 is given by $$u = p/(\rho_o v_s).$$

For $p = 10^{10}$ dyne/cm² which would correspond to 500 kG of magnetic pressure, $\rho_o = 10$ gm⁻³ and $v = 1.5 \times 10^5$ cm/sec, the initial velocity u of the hammer 34 would be $6 \times 10^3$ cm/sec which is relatively easily attainable.

In keeping with the invention, the maximum magnetic field obtainable by the liquid liner 24 compression may be limited by the maximum current density in the conducting liquid or conductor. A rough estimate may be obtained by calculating the time $\tau_b$ it takes to change the phase of the conductor. Thus, $$\tau_b \approx \frac{C(T_b - T_o)}{\eta j^2},$$

where $\eta$ is the average resistivity, j is the current density, C is the heat capacity per volume, and $T_b$ and $T_o$ are the boiling or melting points and the initial temperature. For the copper liners, we have $C \sim 10^6$ cal/m³, $T_b \sim 1000°$ C., $\eta \sim > \times 10^8$ ohm. With $T_b = 10^{-4}$ sec, the current density is given by $$j \approx \left[ \frac{C(T_b - T_o)}{\eta \tau_b} \right]^{\frac{1}{2}}$$

$$\approx \left( \frac{4 \times 10^6 \times 700}{7 \times 10^{-8} \times 10^{-4}} \right)^{\frac{1}{2}} = 2 \times 10^{10} \text{ amp/m}^2.$$

The maximum field and current density are related through $$B_m = \mu_d j \delta,$$

where $\delta$ is the skin depth and is given by $\delta = (\mu_o/\tau_b \eta)^{-\frac{1}{2}}$. Then $B_m$ becomes $$B_m = \mu_o \left[ \frac{C(T_b - T_o)}{\eta \tau_b} \right]^{\frac{1}{2}} \left[ \frac{\tau_b \eta}{\mu_o} \right]^{\frac{1}{2}}$$

$$= [C(T_b - T_o) \mu_o]^{\frac{1}{2}}$$

For copper, $B_m$ becomes approximately 500 kG. This value is pessimistic because copper is still a relatively good conductor after it is melted. Also, the high pressure may help in increasing the melting points. For a liquid conductor, the evaporation rate limits the maximum magnetic field strength. The evaporation at the vacuum and fluid interface will move back the current carrying layer. If the displacement is small compared to the skin depth, then the evaporation is tolerable. The limit on the field is then given by $$(B_m^2/\mu_o^2) < \frac{H\delta^2}{\eta \tau}$$

where H is the heat of evaporation per unit volume, $\delta$ is the skin depth, and $\tau$ is the duration. By using the formula for the skin depth, we obtain $$B_m^2/\mu_o < H.$$

For a typical value of $H = 4 \times 10^4$ J/cm³, $B_m \sim 2 \times 10^6$ G.

Various aspects of the present invention will now be further described with particular reference to the embodiment of apparatus 50 illustrated in FIGS. 2 and 3 of the drawings.

The apparatus 50 is substantially similar to the apparatus 10 of FIG. 1 in respect of aspects not shown in the drawing of FIGS. 2 and 3. FIG. 2 is a cross sectional side view of one end of the apparatus 50 taken through the longitudinal axis of the apparatus, and FIG. 3 is a cross sectional view taken through line 3—3. Reference numerals corresponding to the reference numbers of the embodiment of FIG. 1 are increased by 50 in the embodiment of FIGS. 2 and 3. The apparatus 50 includes a containment vessel, indicated generally at 60, fabricated from nonmagnetic metals, which also acts as the main structural unit of the apparatus, plus stationary wall members 64 and radially movable wall members 66. The movable members 66 are located between the stationary members, and the movable and stationary members alternate around the circumference of the apparatus. As in the apparatus 10 of FIG. 1, there are inner surfaces of the members 64 and 66 in the apparatus of FIG. 2 which are curved to define the circularly cross sectioned bore defined generally at 62. As will be described hereinafter, the movable wall members 66 can be driven toward one another to reduce or constrict the effective diameter of the bore 62. End pieces 68 close the ends of the apparatus and, together with the bore 62, effectively define a reservoir for the rotating liquid liner 74.

It should be understood that while six movable wall members 66 are specifically shown in the drawings to reduce the diameter of the bore, the apparatus could also be designed to utilize a greater or fewer number of movable wall members. The use of six members as shown is particulrly suited to the six-pole three phase electrical system as will be described hereinafter.

In keeping with the invention, a liquid conductor or liquid liner 74 is placed in the bore 62 so that it is partially filled, the liquid conductor preferably being a metal of low melting point in the liquid state, such as lithium, sodium, mercury, lead or aluminum. Lithium has the advantage that it breeds tritium from neutrons released by a fusion reaction, and also serves as a blanket. While other liquid metals also function as blankets, they do not breed tritium. Sodium is low in cost and has a low melting point. Mercury, lead and a number of other metals have the advantage of high mass density. Aluminum has a rather high melting point, but it has the important advantages of high electrical conductivity and low compressibility.

Three sets of induction coils, shown as 76a, 76b, and 76c consisting of electrical conductors along the length of and parallel to the axis of the bore, are energized by an alternating current and cause the liquid liner to rotate inductively about the axis in the same manner as the rotor of an induction motor at a predetermined angular velocity so that centrifugal force will create a cylindrical space 78 of predetermined diameter along the axis. A magnetic coil 80 is positioned to surround the containment means and apply a relatively weak magnetic field of about 0.2 T to 0.5 T along the length of the cylinder parallel to the axis. Plasma 82 is created in the cylindrical vacuum space 78 by independent means, such as by injection from a pair of coaxial plasma guns 84, one located adjacent each end of the apparatus, through injection holes 70 located in the end piece 68.

It should be understood that the two ends of the apparatus are of similar construction with the plasma injected from each end meeting in the center of the space 78 and expanding to fill this space.

Parameters for an initial hydrogen (e.g., D-T) plasma for the apparatus may typically be: electron and ion particle densities $n_e = n_i = 5 \times 10^{21}$ m$^{-3}$, temperature $T = 100$ eV and a radius of about 1.0 m, corresponding to an internal energy of 0.75 MJ per meter of length. High efficiency coaxial plasma guns producing low divergence streams of pure plasma are well-known [e.g., "Plasma Deflagration and the Properties of a Coaxial Plasma Deflagration Gun," D. Y. Cheng, Nuclear Fusion, 10, (1970) p. 305; bracketed references are incorporated herein by reference], and are capable of being scaled up to large sizes and energy ratings ["Scaling of Deflagration Plasma Guns," Chang, et al., Bull. APS, Series II, 10, (1975) p. 1348]. Ablator spheres 86, rotated by motors 100, are synchronized to pass in front of the plasma guns 84 after injection, and during the plasma compression and heating phase, to protect the plasma guns from high energy plasma escaping through holes 70. A time interval of about 3 msec exists to accomplish this, requiring that the ablator be rotated at about 3000 to 4000 rpm in this example. The injected plasma will expand into the vacuum region 78 until a pressure balance at $\beta = 1$ is reached between the plasma and the initial axial magnetic flux from coils 80 trapped by the conducting fluid. The axial magnetic field thus insulates the plasma 82 from the inner surface of the liner, just as in a conventional theta-pinch plasma discharge.

To compress the magnetic field and thereby the plasma through the pinch effect so that the plasma will reach high temperatures, approaching or reaching thermonuclear temperatures, the rotating conductor or liner 74 may be compressed by physically moving the wall members 66 toward each other at a sufficient speed to be effective. Thus, an impulse or force is applied to the movable wall members 66 by apparatus which is similar to pneumatic high-energy-rate drivers of the type that are presently used in shock testing large components. As shown in FIG. 2, the movable wall members 66 are positioned within recesses in a manner analogous to pistons within cylinders. Reservoirs 90 may be filled with high pressure gas at 400 atm to 500 atm (6000 psi to 7500 psi), used to drive the movable wall member 66 when a series of high speed valves, schematically illustrated at 92, are opened to communicate the high pressure gas into the space 94 behind the movable wall member 66. The high pressure gas accelerates the movable wall members 66 up to a suitable velocity of, for example, about 30 meters per second, and causes them to displace the liner fluid from the volumes indicated by the dashed outlines 96 and to thereby reduce the diameter of the cylindrical space 78 therein. This compresses the magnetic field and thereby pinches the plasma 82 as previously stated, so that it may, for example, attain thermonuclear temperatures on the order of about 10 keV at a density of about $10^{19}$ cm$^{-3}$ ($10^{25}$m$^{-3}$).

Although the invention is operable over a considerable range of physical parameters, the following description discusses one set of parameters for an apparatus employing a liner of liquid aluminum which is capable of reaching thermonuclear conditions. The aluminum liner, of mass density $\rho = 2700$ kg/m$^3$ and length $L = 40$ m, has an outer radius $r_{20} = 2.0$ m (identical with the radius of the reservoir) and an inner radius of 0.90 m initially. This liner is made to rotate at 375 rpm. When driven by a mean pressure of $2.7 \times 10^7$ nt/m$^2$ (3900 psi) the inner circumference of the liner reaches its minimum value of radius, $r_m = 3.0$ cm, in about 8 msec, thereby compressing an initial plasma of density $n = 5.6 \times 10^{21}$m$^{-3}$ and temperature $T = 110$ eV contained by a $\beta = 1$ magnetic field, $B = 0.7$ Tesla, to final values $n = 5 \times 10^{24}$ m$^{-3}$ $T = 10$ keV and $B_m = 200$ Tesla. This highly compressed thermonuclear state persists for about 20 $\mu$sec before the liner rebounds significantly, driving the movable wall members 66 outward and back toward their initial positions. Radial displacement of the movable wall members is 22 cm, and they move at a speed of about 30 m/sec. The mean gas pressure in volume 94 needed to drive the movable wall members, and accounting for a wall mass of 1500 kg/m$^2$, is $3.7 \times 10^7$ nt/m$^2$ (5400 psi). The gas pressure needed to balance the centrifugal pressure of the rotating liner between compression pulses is $6.6 \times 10^6$ nt/m$^2$ (960 psi). The total compression and rebound cycle takes about 16 msec. The plasma column is about 40 meters long, and the compression requires an energy of 80 Mj/m, or about 3.2 Gj in all.

The pneumatic activators illustrated in FIG. 2, employ principles similar to known activators built by Impulse Products Corporation (337 Industrial Ct., San Diego, Ca 92121) which have achieved a peak velocity of 900 ft/sec (270 m/s), nearly ten times that required for the embodiment of the invention described herein. The energy per unit area is simply the product of pressure and stroke. The necessary components and techniques for operation at the previously discussed gas pressures are within the conventional skill of the pneumatic activator art.

The movable wall members 66 project into the bore 62 containing the rotating liquid liner when they are activated, as indicated in the drawing by the dashed outlines 96. However, the volume of fluid stopped and trapped in the wedge-shaped volumes 98 is small, and the energy lost by this trapping and by turbulence as the movable wall members advance into the bore 62 is negligibly small compared to the energy of the compression pulse. Furthermore, both the convergence of the fluid and its rotation act to reduce the effects of the discontinuities between the movable wall members, so that as demonstrated by recent experiments at the Naval Research Laboratory, the final compressed stage is highly symmetrical.

Several conventional techniques are used to lubricate and seal the illustrated movable wall members 66. Standard packings and pressurized oil film lubrication are adequate for sealing and lubricating when the liquid metal liner 74, consists of mercury at limited temperatures. At higher temperatures and/or with more reactive liquid metals, a high pressure fluid dynamic lubrication system, using the same liquid metal as used in the liner, is preferred. The preferred seal for high temperature gas-liquid metal interfaces is the standard frozen seal, where, by appropriate control of the temperature gradients, a self-adjusting self-healing seal of barely solidified liner metal is made to form between the movable and stationary wall members 66 and 64.

With respect to the coils 76a, 76b, and 76c, they are adapted to provide a steady rotation of the liquid liner 74 at an angular velocity sufficient to maintain the stability of the inner surface of the liner. The usual turbulent viscous losses are increased by the presence of the rotating field generated by the coils 76. These magnetoviscous losses are about 25 MW, much less than the fusion power capable of being produced by the apparatus, and in any event, readily supplied to the system.

Coils 76 provide a magnetic field strength of approximately 0.1 Tesla. Thee pairs of coils are employed in the apparatus of FIG. 2, since the illustrated embodiment utilizes a three phase six-pole arrangement. However, a greater or lesser number of poles, with a corresponding increase or decrease in the number of movable wall members, may be employed at the discretion of the designer (however, it is noted that a two-pole induction coil configuration would lead to excessive radial magnetic field in the plasma region and to subsequent plasma instability). The coils 76 may be made from several relatively thin insulated transposed copper bars, as is standard practice for the construction of stator windings of large alternating current motors and alternators. The bars are adapted to carry electric current parallel to the axis of the bore 62. Each of the coils 76a, 76b, and 76c extends beyond the ends of the bore, where they are bent around to be continuous with the neighboring coil carrying the same designator. The six-coils 76 shown in FIG. 2 dissipate approximately 10 MW of power in the coil resistance, an acceptably low value.

The coils 76 together generate a rotating magnetic field configuration which must penetrate to the liner 74 to act upon it. Thus, the stationary and movable wall members 64 and 66 and the end piece 68, are preferably fabricated from either nonconducting, semi-conducting or suitably laminated conducting materials. Self-bonded silicon carbide, such as Refel silicon carbide, is an excellent material for these members, and possess an ultimate tensile of 40,000 psi at 1000° C., a compressive strength of 500,000 psi, and good resistance to thermal and mechanical shock. The containment vessel 60 may be metallic, since it is well removed from coils 76.

The coils 80 carry electric current around the apparatus in the azimuthal direction as shown and produce a steady magnetic field within the bore 62. In this regard, the walls 64 and 66 as well as the apparatus which drives the movable walls 66 toward one another, are fabricated from nonferromagnetic materials so that the field produced by the coils 80 is not affected by the presence of ferromagnetic materials. In the event ferromagnetic materials are employed, their size and placement should be such that the magnetic field configuration produced by the coils 80 within the bore 62 is not adversely affected. The coils 76 are magnetically orthogonal to, and therefore completely uncoupled from, the coils 80.

The exact size and spacing of the coils 80 from one another is not critical for proper operation of the apparatus, the final choice of spacing being the result of factors such as field homogeneity in the rotating liner 74, access to the portions of the apparatus between adjacent coils 80, the field strength limitations of superconducting materials, and structural considerations, such as the strength and mounting of coils 80.

The volume 78 is evacuated during the time between compression pulses by vacuum pumps attached to ports 104 at each end of the apparatus. The speed of evacuation is limited by the conductance of the 24 cm diameter openings 70, if a total vacuum pumping capacity exceeding $10^6$ liter/sec at a base pressure of $10^{-3}$ Torr is provided. The gas flow through opening 70 is viscous at the operating pressures of $10^{-1}$ to $10^{-2}$ Torr, and is approximately $4.5 \times 10^4$ liter/sec through each end, independently of pressure. Thus, the gas pressure in the $1.2 \times 10^5$ liter volume 78 is reduced by a factor of 2 in 1.0 seconds or by a factor of 10, in 3.2 seconds. Since DT burnup is only 0.25% when the apparatus is employed for thermonuclear fusion, the accumulated helium concentration in volume 78 with steady pulsing is only 0.25% of the DT concentration when the pressure is reduced by a factor of 2 after each compression. Unlike the case of low density plasma devices such as tokamaks, accumulation of other impurity gases and vapors is not a problem, and a repetition rate on the order of about one pulse per second may be utilized.

In connection with the power which may be generated by DT thermonuclear reactions in the apparatus of FIG. 2, the thermal power $W_t$ released per pulse may be represented as $$W_t = (3.2 \times 10^{-12} \text{ joule/fusion}) \pi r_m^2 L \tau_f (\frac{n^2}{4}) \overline{\sigma v}$$

where $\tau_f$ is the duration of peak compression, 20 μsec, and $\overline{\sigma v} = 1 \times 10^{-22}$ m³/s is the DT reaction rate at 10 keV, giving $4.5 \times 10^9$ joule/pulse. At a repetition rate of one pulse per second and a 33% efficient thermal conversion cycle, this would yield 1500 MW of electrical power for the apparatus.

In embodiments of the present invention which are intended to be used in controlled thermonuclear fusion applications, the Lawson criterion, $n\tau \geq 10^{20} \text{m}^{-3}$, must be satisfied, for example at the T=10 keV temperature previously referred to, where $\tau_\epsilon$ is the plasma energy confinement time. For such embodiments, the Lawson criterion can be met, for example with $n=5 \times 10^{24} \text{m}^{-3}$ and $\tau_\epsilon = 20$ μsec by the apparatus described herein. A 200 Tesla magnetic field may be utilized for the confinement of a $\beta=1$ plasma at T=10 keV and $n=5 \times 10^{24} \text{m}^{-3}$.

With the straight configuration, the end loss time is the dominant loss. If the plasma is free to stream out the ends without restriction, the confinement time is then given by the streaming time $$\tau_\epsilon \tau_s \approx L/2 v_s$$

where L is the length of the device and $v_s$ is the sound wave velocity. At a plasma temperature of 10 keV, $V_s = 10^6$ m/sec, and then the plasma length requirement is $$L \geq \frac{2 \times 10^{26}}{n} \ (m)$$

For $n=5 \times 10^{24} \text{m}^{-3}$, the plasma column should thus be at least 40 m long.

If, on the other hand, plasma is not free to flow out the ends, the energy confinement time will be determined by the relatively large thermal conduction parallel to the axis of the plasma column. This is the situation that arises when solid walls, dense walls, dense gas or cold, dense plasma are present at the ends to provide an inertial end plugging. In this connection, for the example of an inertial end plugging gas or cold plasma of mass density $\rho_g = n_g m_p A$, where $n_g$ is the particle density of the plugging gas or plasma, $m_p$ is the mass of a proton and A the atomic weight, the time required to displace a length Δx of gas by its own length due to the pressure p exerted by the plasma is given by the equation for uniformly accelerated motion $$\Delta x = \frac{1}{2} \frac{pt^2}{\rho_g \Delta x}$$

For a cold plasma which is in rough pressure equilibrium with the hot plasma being contained, then $p \approx 2 n_g e T_g$, and $$t = 10^{-4} (A/T_g)^{\frac{1}{2}} \Delta x$$

for $T_g$ in (eV). Thus, a 10 eV argon plasma (A=40) one meter in length will plug the end for about 200 μsec; a 1 eV argon plasma will plug it for over 600 μsec. Both greatly exceed the required $\tau_\epsilon$. In this regard, it takes the liner 74 of the illustrated embodiment of FIG. 2 about 300 μsec to travel the last 9 cm, from the 12 cm-radius hole 70 in end piece 68 to the final compression radius, $r_m = 3$ cm. Therefore, one or two meters of extra length is allowed at each end of the apparatus, and provision is made to inject the appropriate quantity of cold gas at some time during the compression. The exact time is not very critical since the cold gas does not have time to intermingle greatly with the cool hydrogen plasma near the ends, but it should preferably be before the compression has raised the plasma pressure to elevated values. FIG. 2 shows tube 106 and remotely actuated fast electrical valve 108, both representative of many such tubes and valves which may be utilized to produce a nearly uniform distribution of the injected gas.

More specifically in connection with the end-plugging of the system of FIGS. 2 and 3, the energy loss from an end-plugged plasma will therefor be due primarily to its thermal conductivity to the ends, parallel to the applied magnetic field. The thermal conductivity of a fully ionized hydrogenic plasma is $$\kappa = CT^{5/2}$$

where $C = 1 \times 10^{14} (W/(keV)^{7/2} - m)$. The heat flow is given by $$S = -\kappa \frac{dT}{dx} = -\frac{2}{7} C \frac{d}{dx} (T^{7/2})$$

Assuming that the heat flow is zero at the midplane of the plasma column (x=0) and grows linearly to its maximum value $S_o$ at the ends (x=±L/2), the above equation can be integrated and solved to find $$S_o = \frac{8}{7} \frac{CT^{7/2}}{L} \ (W/m^2)$$

where T is now the midplane temperature in keV. The energy loss time due to thermal conduction is then $$\tau_\epsilon = \tau_t = \frac{3n(10^3 e) T L}{2 S_o}$$

$$= 4 \times 10^{-30} n L^2 / T^{5/2}$$

For $n = 5 \times 10^{24} m^{-3}$, $L = 40$ m and $T = 10$ keV this gives $\tau_t = 1.0 \times 10^{-4}$ sec, which is greater than necessary to satisfy the Lawson criterion. Although plugged end embodiments of the apparatus of FIG. 2 are preferred over "open ended" embodiments, open ended embodiments may also be used. In such open ended systems, the $\tau_\epsilon$ that results from free streaming alone permits satisfaction of the Lawson criterion.

The dynamics of the plasma compression process will now be discussed in greater detail with respect to such plugged-end systems.

For a plasma 82 heated by adiabatic compression, the following relations hold:

$$n = (r_o/r)^2 n_o$$

$$T = (r_o/r)^{4/3} T_o$$

$$p = (r_o/r)^{10/3} p_o$$

$$\tau_s = (r/r_o)^{2/3} \tau_{so}$$

$$\tau_t = (r/r_o)^{4/3} \tau_{to}$$

where the subscript o denotes the initial state, r is approximately equal to the instantaneous value of $r_1$, the inner radius of the liquid liner 74, and the specific heat ratio $\gamma = 5/3$ for a collisional plasma. The maximum pressure of the desired compressed plasma, $p_m = 1.6 \times 10^{10}$ nt/m$^2$, is so substantial that it could be capable of destroying the end pieces 68. An acceptable pressure to act on the end pieces 68 is $2 \times 10^8$ nt/m$^2$ (30,000 psi), which will be reached when $r = 4.0 \ r_m$, where $r_m$ is the minimum radius to which the plasma is compressed. Since $r_m$ was selected as 3 cm, hole 70 in end piece 68 is made with a radius of 12 cm. A replaceable sleeve 72 is provided, to receive the inevitable erosion damage.

Furthermore, it will now be appreciated that, if the initially injected plasma has a particle density $n_o = 5.6 \times 10^{21} \ m^{-3}$ and a temperature $T_o = 110$ eV, and if $r_{1o} = 90$ cm while $r_m = 3$ cm, then the compressed plasma will have $n = 5 \times 10^{24} \ m^{-3}$ and $T = 10^4$ eV as desired.

The collision mean-free path λ scales as $$\lambda = (r_o/r)^{2/3} \lambda_o$$

so if the plasma is collisional in the final state, it is collisional during the compression. For particle densities of $n = 5 \times 10^{24} \ m^{-3}$ and a temperature $T = 10$ keV, the collisional mean-free path is 1 m. Therefore, the plasma 32 in a 40 m device is collisional at all times, which justifies the use of $\gamma = 5/3$.

The described method of injection produces an initial plasma having $\beta = 1$, or substantially perfect balance between the plasma pressure and the pressure of the axial magnetic field in region 78. This condition will persist throughout the compression and the plasma will keep a sharp boundary if the compression time is much shorter than the skin time $\tau_{skin}$:

$$\tau_{skin} = \mu_o \delta r^2$$

Since the electrical conductivity δ of the plasma is independent of n and proportional to $T^{3/2} \propto r^{-2}$, $\tau_{skin}$ is independent of radius. Calculating for the compressed plasma, $\delta = 10^9$ (ohm·m)$^{-1}$ and $r_m = 0.03$ m, giving $\tau_{skin} = 1$ sec, which is much longer than the compression time. Therefore, β is likely to be near unity.

A lower limit on the plasma radius is determined by heat conduction and skin effect considerations. The classical cross field energy confinement time $\tau_E$ is given by $$\tau_E = \frac{r^2}{D} \sqrt{\frac{m_e}{m_i}}$$

where D is the classical diffusion constant and is given by $D = p/\sigma B^2$. By using the equivalent form $D = \beta/\mu_o \sigma$, the following expression for $\tau_E$ may be provided:

$$\tau_E = \mu_o \sigma r^2 \beta^{-1} \sqrt{m_e/m_i} \text{ m}$$

For conditions of $\beta = 1$ and $\sigma = 10^9$ ohm$^{-1}$m$^{-1}$, $\tau_E$ may be calculated as $$\tau_E = 15r^2 (\text{m})$$

and a radius of 1 mm is enough to provide $\tau_E = 15$ μsec. However, it is not desirable to choose a plasma radius much smaller than the skin depth of the liner fluid 74, because then the stored magnetic energy in the fluid becomes too large a fraction of the total energy. The fluid skin depth δ may be represented as $$\delta = \sqrt{\tau/\mu_o \sigma_f}$$

where $\sigma_f$ is the electric conductivity of the fluid. For $\sigma_f = 10^6$ ohm$^{-1}$m$^{-1}$, typical of very hot molten aluminum and $\tau = 2 \times 10^{-5}$ sec. the fluid skin depth δ is thus 4 mm. Therefore, the plasma radius $r_m$ in the illustrated embodiment should be larger than a centimeter or so. The previously discussed value of 3 cm satisfies this requirement.

To provide an understanding of the dynamics of compressing or imploding the liner material 74 by moving the movable wall members 66 toward one another, the following description discusses various factors that are involved in terms of a hollow cylinder of incompressible fluid, representing the liquid liner 74, and a vacuum magnetic field that is compressed by the liner. The fluid cylinder has inner radius $r_1$, outer radius $r_2$ and mass density ρ. When a pressure $p_{eff}$ is applied around the cylinder at time $t = 0$, the following equations describe the motion:

$$\frac{d}{dt}\left[\left(\frac{dr_2^2}{dt}\right)^2 \ln\left(\frac{r_2}{r_1}\right)\right] = -\frac{4}{\rho} \frac{dr_2^2}{dt} p_{eff}$$

$$\frac{d(r_2^2)}{dt} = \frac{d(r_1^2)}{dt}$$

To obtain an approximate solution, the time derivative of the logarithmic term may be neglected, obtaining $$\frac{d^2}{dt^2}(r_2^2) = -\frac{2p_{eff}}{\rho}\left(\ln\frac{r_2}{r_1}\right)^{-1}$$

Under conditions of constant pressure, the following equations obtain:

$$r_2^2 = r_2^2(t = 0) - \frac{p_{eff} t^2}{\rho \ln(r_2/r_1)}$$

$$r_1^2 = r_1^2(t = 0) - \frac{p_{eff} t^2}{\rho \ln(r_2/r_1)}$$

The compression time $\tau_c$ is given by $$\tau_c = \left\{\frac{[r_1^2(t = 0) - r_m^2] \rho \ln r_2/r_1}{p_{eff}}\right\}^{\frac{1}{2}}$$

For a particular, constant driving pressure $p_{eff}$ of $3.18 \times 10^7$ nt/m$^2$, a liner density ρ of 2700 kg/m$^3$ (aluminum), an inner radius $r_1$ (t = 0) of 0.9 m, a compressed radius $r_m$ of 0.03 m and a liner outer radius $r_2$ of 2 m, the compression time is $\tau_c = 8.0$ msec, as previously indicated.

With this high pressure, the assumption of incompressibility does not apply unless the transit time of the sound wave is much shorter than the compression time. The sound wave velocity is of the order of 5000 m/sec, and the transit time is about 0.2 msec, which is much shorter than $\tau_c$. Accordingly, the inclusion of compressibility considerations does not appreciably change the indicated results and therefore the equations are applicable to the liquid liner 74.

The choice of $p_{eff}$ may be determined by the energy needed to compress the plasma, whose final energy density is $3/2 \, p_m$:

$$p_{eff} \Delta V = \frac{3}{2} \pi r_m^2 p_m$$

Since $\Delta V \approx \pi r_{10}^2$ for the incompressible liner 74

$$p_{eff} = 1.5 \frac{(r_m)}{r_{10}} p_m$$

if $r_{10}/r_m = 30$ and $p_m - 1.6 \times 10^{10}$ nt/m$^2$, then $p_{eff}$ should be $2.7 \times 10^7$ nt/m$^2$ in this example.

Deceleration starts when the magnetic field inside the cylinder is compressed and its pressure becomes significant. From the laws of flux conservation:

$$\frac{d}{dt}\left[\left(\frac{dr_1^2}{dt}\right)^2 \ln\frac{r_2}{r_1}\right] = \frac{4}{\rho} \frac{B_m^2 r_m^4}{2\mu_o} \frac{1}{r_1^4} \frac{dr_1^2}{dt}$$

where the subscript m denotes the values where the compression ceases. By integrating over time, $$\frac{dr_1}{dt} = \frac{r_m}{r_1}\left(\frac{B_m^2/2\mu_o}{\rho \ln(r_2/r_m)}\right)^{\frac{1}{2}}\left(1 - \frac{r_m^2}{r_1^2}\right)^{\frac{1}{2}}$$

and $$\phi + \frac{1}{2} \sinh 2\phi = \left(\frac{B_m^2/2\mu_o}{\rho \ln(r_2/r_m)}\right)^{\frac{1}{2}} \frac{2t}{r_m}$$

where $$r_1 = r_m \cosh \phi$$

The thermonuclear fusion power varies nearly as the magnetic field to the fourth power, or as $r_1^8$. The duration of the fusion reaction is then defined by the time interval during which $(r_1/r_m)^8 \geq 2$, or $(r_1/r_m) \geq 1.09$, $\phi \geq 0.42$. Allowing for both the slowdown and rebound phases of the motion, the fusion time $\tau_f = 2t_{(\phi = 0.42)}$, or $$\tau_f = 0.89 \, r_m \left( \frac{\rho \ln(r_2/r_m)}{B_m^2/\mu_o} \right)^{\frac{1}{2}}$$

For $r_m = 0.03$ m, $B_m^2/2\mu_o = p_m = 1.6 \times 10^{10}$ nt/m$^2$, $\rho = 2700$ kg/m$^2$ and $r_2 = 2$m, the calculated fusion time is $\tau_f = 22.4$ sec. This is slightly in excess of the 20 μsec needed to satisfy the Lawson criterion in the previously described embodiment and is the primary reason for the selection of $r_m$ to be 3 cm. As indicated in the illustrated embodiment the other free parameter, $B_m$, is chosen in the illustrated embodiment to be 200T, which is selected to be below the value for catastrophic vaporization of the liquid liner surface.

In keeping with the various aspects of the illustrated embodiment of the invention, the maximum magnetic field obtainable by the liquid liner 74 compression may be limited by the maximum current density permitted in the conducting liquid. For a liquid conductor, the evaporation rate limits the maximum magnetic field strength; the evaporation at the vacuum and fluid interface will move back the current carrying layer. The energy dissipated per unit volume in the skin layer, equal to $B_m^2/2\mu_o = p_m$, must be kept less than the heat of vaporization per unit volume H. For aluminum, $H = 2.8 \times 10^{10}$ joule/m$^3 = 2.8 \times 10^{10}$ nt/m$^2$. Thus, the choice of $B_m$ equal to 200 Tesla is conservative.

The thermal conduction energy loss time $\tau_t$ is calculated to be about 9 msec for the initially injected plasma having $n = 5.6 \times 10^{21}$ m$^{-1}$ and $T = 110$ eV in a 40 meter long plasma column. This is none too long compared to the previously calculated compression time, 8 msec, or to the more relevant characteristic time of about 5 msec that can be calculated for the first doubling of the plasma temperature. Thus, substantial cooling, resulting in less compression heating than predicted by an adiabatic compression formula will occur. To compensate this initial energy loss and cooling, either the plasma column can be increased in length, thereby increasing $\tau_t$ as L$^2$; or the plasma gun injectors can be designed to produce a slightly hotter initial plasma. The latter course is considered to be more economical, and 40 meters is confirmed as a suitable (although not unique) length for the plasma column of the illustrated apparatus.

When the imploding cylindrical liner 74 is being decelerated, it becomes unstable as a result of the Raleigh-Taylor fluid instability. The growth rate G is given by $$G = \sqrt{kg}$$

where g is the deceleration, and k is the wave number (and is given by m/r). The deceleration is calculated by taking the time derivative of the equation for $dr_1/dt$ above and is $$g = \frac{d^2 r_1}{dt^2} = \frac{B_m^2/\mu_o}{r_1 \rho \ln(r_2/r_1)} \left[ \frac{2r_m^4}{r_1^4} - \frac{r_m^2}{r_1^2} \right]$$

or $$g = 2 \frac{B_m^2/2\mu_o}{r_m \rho \ln(r_2/r_m)}$$

at maximum deceleration, when $r_1 = r_m$. For the conditions of $B_m^2/2\mu_o = 1.6 \times 10^{10}$ nt/m$^2$, $r_m = 0.03$ m, $r_2 = 2$ m and $\rho = 2700$ kg/m$^3$, we have $g = 9.4 \times 10^7$ m/s$^2$ and $G = 5.6 \times 10^4$ √m sec$^{-1}$. This is more rapid than the desired confinement time, except for small m modes.

To stabilize the liner 74, it is rotated by the induction coil 76, much the same as the operation of an induction motor. If the liner is given angular velocity $\Omega_o$ initially, the compression will increase the angular velocity. The radial distribution of the angular velocity depends on viscosity. The time constant for the viscous damping $\tau_v$ is long for liquid metals. It is given by $$\tau_v \approx \frac{\rho \, r^2}{\eta}$$

where η is the viscosity, which is $1.5 \times 10^{-3}$ kg/m-sec (1.5 centipoise) for molten aluminum. For $r = 0.03$ m, one obtains $\tau_v = 1600$ sec. Therefore, the viscosity is negligible and the angular momentum of the fluid element is preserved.

The angular velocity Ω of a fluid element at radius r is given by $$\Omega = \Omega_o r^2(t=0)/r^2$$

The centrifugal force at the interface is given by $$\rho r_1^4(t=0) \, \Omega_o^2 r_1^{-3}$$

With the centrifugal force included, the growth rate becomes $$G = [kg - 3kr_1^4(t-0)r_1^{-3} \Omega_o^2]^{\frac{1}{2}}$$

The stability condition is given by $$\Omega_o > \frac{r_m^2}{r_{10}^2} \sqrt{g/3r_m}$$

With $g = 9.4 \times 10^7$ m/s$^2$, $r_{10} = 0.9$ m, and $r_m = 0.03$ m, stability is obtained for $\Omega_o > 36$ radian/sec $= 344$ rpm. This value is easy to obtain. If the angular velocity is too large, the compression will stop before the inside magnetic pressure builds up to the desired value. This sets an upper limit on $\Omega_o$ for a desired value of magnetic pressure under specified operating conditions. This condition is given by $$\frac{r_{10}^2}{r^2_m} \sqrt{g/3r_m} < \Omega_o < \frac{r_{10}^2}{r_m^2} \sqrt{g/r_m}$$

For the embodiment of FIG. 2, $$344 \text{ rpm} > \Omega_o > 596 \text{ rpm}$$

Thus, the initial angular velocity before compression by the movable wall members 66 is begun should be between 344 rpm and 596 rpm in the illustrated embodiment.

From the foregoing description of the present invention, it should be understood that the apparatus described has many desirable attributes and advantages in terms of initial energy requirements that are involved in elevating plasmas to high temperatures such as temperatures approaching, reaching or exceeding thermonuclear temperatures, and in terms of the relatively uncomplicated structural design and compact size of the apparatus. More specifically, the apparatus of the present invention effectively eliminates the need for a large electrical power switch by reducing the requirement for an extremely high energy magnetic field because of the inclusion of a mechanical drive that compresses the liner and the existing magnetic field to thereby produce the desired pinch effect on the plasma.

Additionally, the use of a rotating electrically conductive liquid such as molten metal, to provide a liner that has a vacuum along the axis has advantages in that it may be compressed using the described mechanical drive and the liner has an increased repetition rate. Moreover, the rotating liquid conducting liner may also function as a blanket provided a suitable liquid such as molten lithium, for example, is used.

Apparatus and methods in accordance with the present invention have particular utility in the study an analysis of the properties and behavior of plasmas, and in particular, the study and analysis of plasmas which are magnetically confined at relatively high beta ratios. The illustrated embodiment is particularly adapted for use in the generation, confinement, study and analysis of hydrogen plasmas (i.e., hydrogen, deuterium, tritium and mixtures thereof such as deuterium-tritium mixtures) at high temperature and high beta ratio magnetic confinement conditions, although the invention may also be used in the production of plasmas containing highly stripped elements of higher atomic number. Accordingly, the methods and apparatus of the present invention find utility as analytical techniques and instrumentation in respect of matter in the plasma state. In this connection, the apparatus may be provided with conventional diagnostic and measurement elements including magnetic probes, inductive pickup loops, particle detectors, photographic and spectrographic systems, microwave and infra-red detection systems and other appropriate elements, the data outputs of which may be utilized directly or recorded, such as by transient data recorders.

As also indicated, the various aspects of the invention may find utility as, or in the design or development of, fusion systems, which of course, need not necessarily be net power producers in order to be utilizable as neutron or other particle or fusion product generators, isotope generators, etc.

The apparatus embodying the present invention, while particularly useful in causing a plasma to approach or exceed thermonuclear temperatures, also has utility in that it may be used to produce a strong magnetic field for other purposes, such as for the measurement or testing of material properties at high magnetic flux conditions.

It is of course further understood that although specific embodiments of the present invention are illustrated and described, various modifications thereof will be apparent to those skilled in the art and, accordingly, the scope of the present invention should be defined only by the appended claims and equivalents thereof.

Various features of the invention are set forth in the following claims.

What is claimed is:

1. Apparatus for providing a pinched, high temperature plasma comprising, in combination:
    containment means having an elongated bore therein for defining a reservoir;
    an electrically conductive liquid located within and partially filling said reservoir;
    means for inductively rotating said liquid to generate sufficient centrifugal force to form said liquid into a thick, rotating liquid liner and to create a cylindrical space extending along the axis of said bore;
    means for creating a plasma along the axis of said bore within said space;
    means surrounding said bore for applying a magnetic field the length of said bore; and
    means comprising a plurality of inwardly movable wall members for mechanically reducing the effective diameter of said bore to apply a substantially axially symmetrical mechanical force impulse to said rotating liquid liner and thereby reducing the diameter of said space within said rotating liquid to compress said magnetic field so as to provide a magnetic pinch effect on said plasma and thereby cause said plasma to be compressed and increase in temperature.

2. Apparatus as defined in claim 1 wherein said liquid comprises a liquid metal.

3. Apparatus as defined in claim 1 wherein said liquid is rotatable at an angular velocity sufficient both to create a vortex zone extending along the axis of said bore and to stabilize the inner surface of said liquid against Raleigh-Taylor instability throughout the compression cycle.

4. Apparatus as defined in claim 1 wherein said containment means is substantially straight and wherein said diameter reducing means and said containment means comprise a plurality of stationary and movable elongated wall members having inner surfaces generally defining said bore, said movable wall members being movable toward one another so as to reduce the effective diameter of said bore.

5. Apparatus as defined in claim 4 wherein said movable wall members are positioned between said stationary wall members around the circumference of said bore.

6. Apparatus as defined in claim 4 including drive means for producing an impulse of force to the movable wall members for reducing the diameter of the bore.

7. Apparatus as defined in claim 6 wherein said drive means comprises an elongated pneumatic outer chamber means for each of said movable wall members, a high pressure fluid reservoir means, and valve means for rapidly communicating high pressure fluid from said reservoir means to each of said chamber means to drive each of said wall members inwardly.

8. Apparatus as defined in claim 1 wherein said liquid rotating means comprises induction coil means having an axis parallel to the axis of the bore which, when energized, causes the conducting liquid to rotate about the axis of said bore.

9. Apparatus for elevating the temperature of a plasma, comprising:
    containment means having an elongated bore therein for defining a liquid reservoir, said containment means further comprising a plurality of wall sections spaced about said bore and extending along the longitudinal axis of said bore which are radially movable in respect to the longitudinal axis of said bore;
    an electrically conductive liquid liner within said containment means,
    means for inductively rotating said liner at such angular velocity that a cylindrically shaped space is created along the axis of said bore;
    means for providing plasma along the axis of said bore within said cylindrical space;

means surrounding said bore for providing a magnetic field the length of said bore; and means for mechanically applying an impulse of force to said radially movable wall sections of said containment means to reduce the diameter of said bore, thereby compressing said rotating liner means to thereby reduce the diameter of said space to provide a pinch effect on said plasma and thereby elevate the temperature of said plasma.

10. Apparatus as defined in claim 9 wherein said liner comprises a liquid, electrically conducting metal.

11. Apparatus as defined in claim 9 wherein said angular velocity is sufficient both to create a space extending along the axis of said bore and to stabilize the inner surface of said liner against Raleigh-Taylor fluid instability at all times.

12. Apparatus as defined in claim 1 wherein said diameter reducing means comprises a hydraulic hammer system for driving said movable wall members inwardly to reduce the effective diameter of said bore.

13. Apparatus as defined in claim 9 wherein said mechanical impulse applying means comprises a hydraulic hammer system for driving said movable wall sections inwardly to reduce the diameter of said cylindrically shaped space.

14. Apparatus as defined in claim 1 wherein said inductive rotation means rotates said liner with a rotational velocity $\Omega_o$ given by:

$$\frac{r_1^2}{r_1^2(t=0)} \sqrt{g/r_1} > \Omega_o > \frac{r_1^2}{r_1^2(t=0)} \sqrt{g/3r_1}$$

where $r_1$ is the inner radius of said liner, $r_1(t=0)$ is the inner radius of said liner before said reduction of the diameter of said bore, and g is the deceleration of said liner.

15. Apparatus as defined in claim 9 wherein said inductive rotation means rotates said liner with a rotational velocity $\Omega_o$ given by:

$$\frac{r_1^2}{r_1^2(t=0)} \sqrt{g/r_1} > \Omega_o > \frac{r_1^2}{r_1^2(t=0)} \sqrt{g/3r_1}$$

where $r_1$ is the inner radius of said liner, $r_1(t=0)$ is the inner radius of said liner before said reduction of the diameter of said bore, and g is the deceleration of said liner.

16. Apparatus in accordance with claim 6 wherein said drive means comprises a plurality of hammers symmetrically disposed about said bore for respectively striking said movable wall members, said hammers having a deceleration time upon striking said respective movable wall members which is substantially matched with the frequency of the compressional acoustic wave generated in said rotating liquid liner by the action of said hammers upon striking said movable wall members.

17. Apparatus in accordance with claim 9 wherein said mechanical impulse applying means comprises a plurality of hammers symmetrically disposed about said bore for respectively striking said movable wall sections, said hammers having a deceleration time upon striking said respective movable wall sections which is substantially matched with the frequency of the compressional acoustic wave generated in said rotating liquid liner by the action of said hammers upon striking said movable wall sections.

* * * * *